(12) United States Patent
Murata et al.

(10) Patent No.: US 12,090,669 B2
(45) Date of Patent: Sep. 17, 2024

(54) OFF-LINE SIMULATION SYSTEM

(71) Applicant: FANUC CORPORATION, Yamanashi (JP)

(72) Inventors: Yuusuke Murata, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 253 days.

(21) Appl. No.: 17/906,277

(22) PCT Filed: Mar. 24, 2021

(86) PCT No.: PCT/JP2021/012229
§ 371 (c)(1),
(2) Date: Sep. 14, 2022

(87) PCT Pub. No.: WO2021/200470
PCT Pub. Date: Oct. 7, 2021

(65) Prior Publication Data
US 2023/0090193 A1 Mar. 23, 2023

(30) Foreign Application Priority Data
Mar. 30, 2020 (JP) .................... 2020-060313

(51) Int. Cl.
*B25J 9/00* (2006.01)
*B25J 9/16* (2006.01)
*G05B 19/4155* (2006.01)

(52) U.S. Cl.
CPC ........... *B25J 9/1671* (2013.01); *B25J 9/1697* (2013.01); *G05B 19/4155* (2013.01); *G05B 2219/50391* (2013.01)

(58) Field of Classification Search
CPC ...... B25J 9/1671; B25J 9/1697; B25J 9/1692; G05B 19/4155; G05B 2219/50391; G05B 2219/39014; G05B 19/427
See application file for complete search history.

(56) References Cited

U.S. PATENT DOCUMENTS

| | | | |
|---|---|---|---|
| 2016/0151915 A1* | 6/2016 | Nishi | B25J 9/1697 901/6 |
| 2016/0239013 A1* | 8/2016 | Troy | B25J 9/1664 |

FOREIGN PATENT DOCUMENTS

| | | |
|---|---|---|
| JP | 2006-260271 A | 9/2006 |
| JP | 2009-119589 A | 6/2009 |

(Continued)

OTHER PUBLICATIONS

International Search Report issued in PCT/JP2021/012229; mailed May 25, 2021.

*Primary Examiner* — Ian Jen
(74) *Attorney, Agent, or Firm* — Studebaker & Brackett PC

(57) ABSTRACT

Provided is an off-line simulation system that enables performance of efficient vision correction training. This vision correction training system for vision correction training is provided with a head mount display capable of displaying an image in a virtual space, and a teaching device communicably connected to the head mount display. The teaching device has: a vision correction unit that, on the basis of a captured image captured by a camera after the position of a workpiece has been moved, performs vision correction on a predetermined movement; and a correction confirmation unit that confirms that the vision correction is appropriately performed on the predetermined movement.

8 Claims, 7 Drawing Sheets

(56) References Cited

FOREIGN PATENT DOCUMENTS

| | | |
|---|---|---|
| JP | 2019-098513 A | 6/2019 |
| JP | 2019-188530 A | 10/2019 |

\* cited by examiner

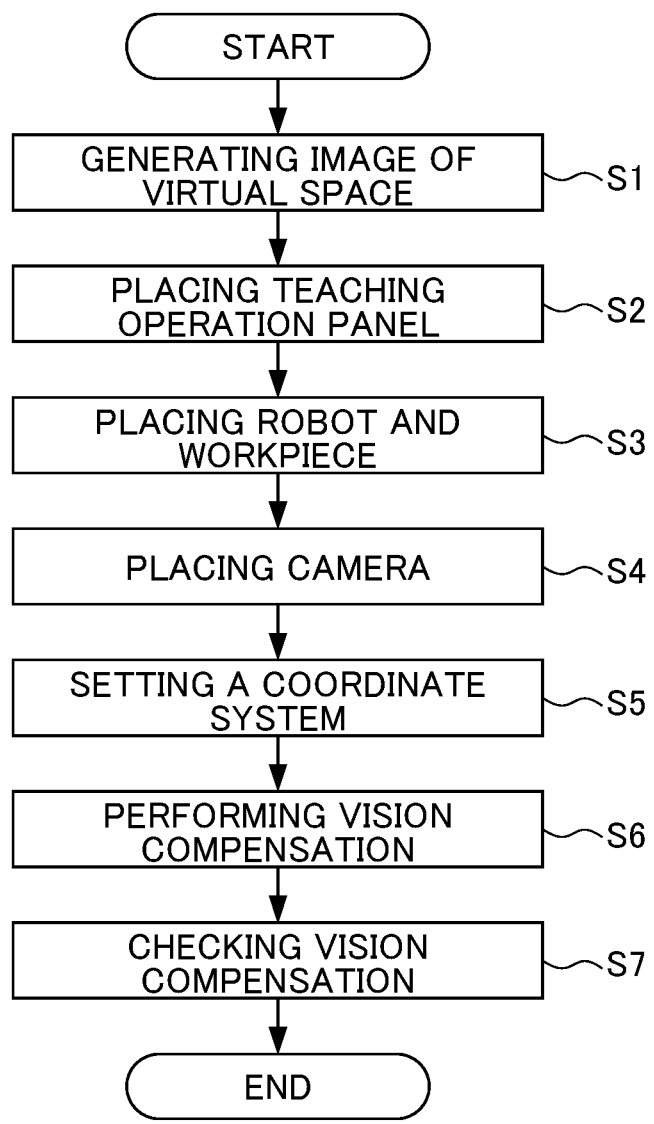

OFF-LINE SIMULATION SYSTEM

TECHNICAL FIELD

The present invention relates to an off-line simulation system.

BACKGROUND ART

In a case where a robot is taught to perform a predetermined motion with respect to a workpiece, if the position of the workpiece at a point in time when the robot is taught to perform the predetermined motion does not coincide with the position of the workpiece at a point in time when the robot performs the motion, the robot cannot properly perform the motion with respect to the workpiece. There is a known method to address this case. According to the method, the workpiece is detected by a vision sensor such as a camera, and an amount of deviation between the positions of the workpiece is subjected to vision compensation (see, for example, Patent Document 1). In order to be able to properly configure the setting for such vision compensation, an operator can receive practical training for setting the vision compensation while actually operating a robot.

Patent Document 1: Japanese Unexamined Patent Application, Publication No. 2006-260271

DISCLOSURE OF THE INVENTION

Problems to be Solved by the Invention

However, allowing the operator to receive the practical training for setting the vision compensation while actually operating the robot requires equipment for the practical training, whereby costs for the equipment are incurred. In addition, it is difficult to intuitively check whether a coordinate system and the like are properly set, and therefore, the operator may not be able to properly configure the setting, and interference or the like may occur. Under the circumstances described above, there has been a demand for a means for allowing an operator to receive practical training for the vision compensation with efficiency.

Means for Solving the Problems

An off-line simulation system according to the present disclosure is for providing practical training for vision compensation. The off-line simulation system includes: an information processor capable of displaying an image of a virtual space; and a teaching apparatus communicatively connected to the information processor. The teaching apparatus includes a virtual space generation unit that generates the image of the virtual space, a teaching unit that places a robot and a workpiece in the virtual space and teaches the robot to perform a predetermined motion with respect to the workpiece, a camera placement unit that places a camera at a position in the virtual space such that the workpiece is within a field of view of the camera, a vision compensation unit that performs, after a position of the workpiece has been moved, vision compensation on the predetermined motion based on an image captured by the camera, and a compensation checking unit that checks whether the vision compensation is being properly performed on the predetermined motion.

Effects of the Invention

The present invention makes it possible to provide practical training for vision compensation with efficiency.

BRIEF DESCRIPTION OF THE DRAWINGS

FIG. 8 is a flowchart illustrating processing performed by the vision compensation training system.

PREFERRED MODE FOR CARRYING OUT THE INVENTION

Figure 1:
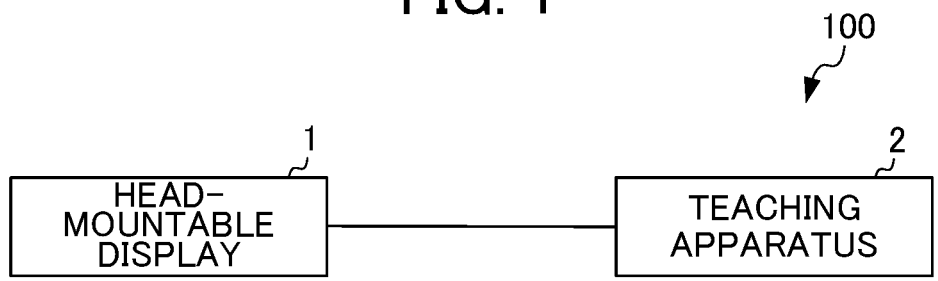
FIG. 1 is a diagram illustrating a configuration of a vision compensation training system according to an embodiment.

An example of embodiments of the present invention will be described below. FIG. 1 is a diagram illustrating a configuration of a vision compensation training system 100 according to an embodiment. The vision compensation training system 100 is an example of an off-line simulation system that allows an operator of a robot to receive practical training for vision compensation in a virtual space in order to become able to perform suitable vision compensation on an actual robot. As illustrated in FIG. 1, the vision compensation training system 100 includes a head-mountable display 1 and a teaching apparatus 2.

The head-mountable display 1 is worn on the operator's head and displays a virtual reality (VR) image. The operator practices (simulates) the vision compensation while viewing the virtual reality image displayed on the head-mountable display 1, whereby the operator immerses him/herself deeply in the world of images and can receive practical training with efficiency. The head-mountable display 1 is connected to the teaching apparatus 2 by wired or wireless communication. Alternatively, the head-mountable display 1 may incorporate the teaching apparatus 2. Although the vision compensation training system 100 according to the present embodiment will be described as a system including the head-mountable display 1 as an information processor, the information processor is not limited to the head-mountable display 1, but may be a desktop computer, a laptop computer, a tablet computer, a smartphone, etc.

The teaching apparatus 2 generates a virtual reality image and transmits the virtual reality image to the head-mountable display 1. The teaching apparatus 2 is connected to the head-mountable display 1 by wired or wireless communication. The teaching apparatus 2 may be incorporated in the head-mountable display 1. The teaching apparatus 2 may be connected to a controller for an actual robot, and an operation may be enabled via a teaching operation panel connected to the controller. The controller for the robot may be a virtual one.

Figure 2:
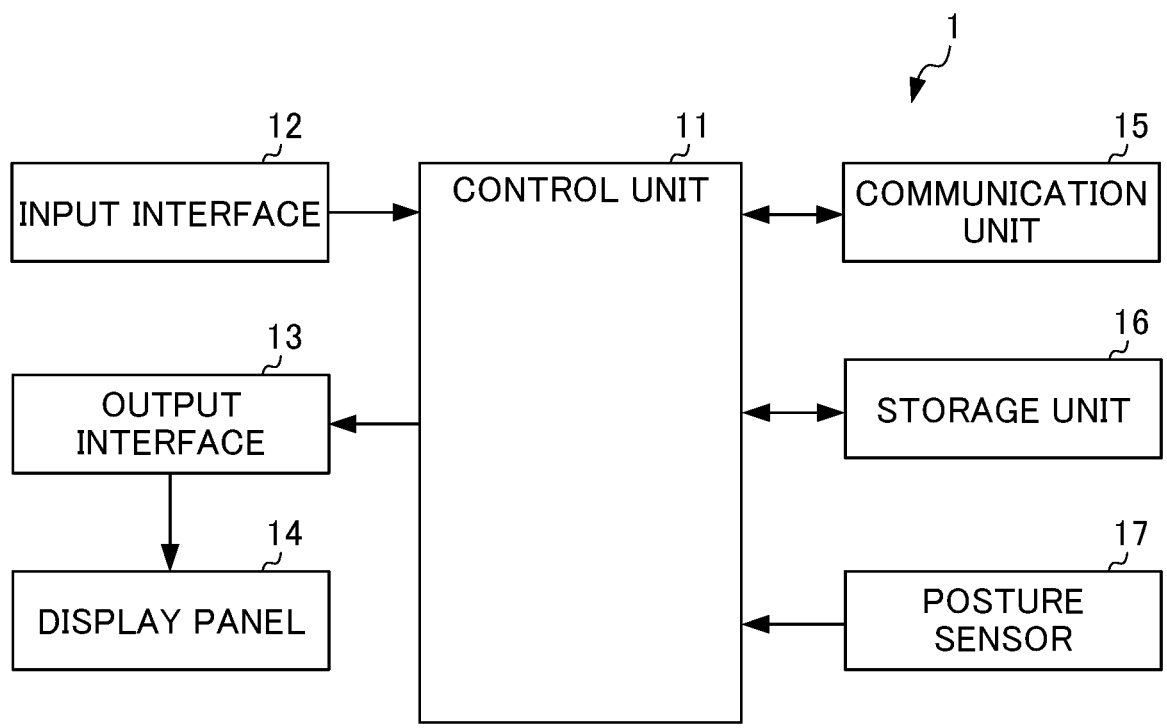
FIG. 2 is a diagram illustrating a configuration of a head-mountable display.

FIG. 2 is a diagram illustrating a configuration of the head-mountable display 1. As illustrated in FIG. 2, the head-mountable display 1 includes a control unit 11, an input interface 12, an output interface 13, a display panel 14, a communication unit 15, a storage unit 16, and a posture sensor 17.

The control unit 11 includes a processor such as a central processing unit (CPU). The control unit 11 processes and outputs, for example, instructions, data, and signals such as an image signal and a sensor signal, by executing programs stored in the storage unit 16.

The input interface 12 accepts an operation signal and a setting signal from a user and provides them to the control unit 11. The output interface 13 receives an image signal from the control unit 11 and displays an image on the display panel 14.

The communication unit 15 is a communication interface for communication with the teaching apparatus 2 via a network. The communication unit 15 includes a processor, a connector, an electrical circuit, an antenna, etc. for performing communication. The communication unit 15 acquires data by performing predetermined processing on a communication signal received from the teaching apparatus 2, and inputs the acquired data to the control unit 11. Furthermore, the communication unit 15 generates a communication signal by performing predetermined processing on the data inputted from the control unit 11, and transmits the generated communication signal to the teaching apparatus 2.

The storage unit 16 is a storage device including, for example, read only memory (ROM) and/or random access memory (RAM) that store an operating system (OS), application programs, etc.; and/or a hard disk drive and a solid state disk drive (SSD) that store other various types of information.

The posture sensor 17 detects position information of the head-mountable display 1 and posture information of the head-mountable display 1, such as a rotation angle and a tilt of the head-mountable display 1. The posture sensor 17 is implemented by combining a gyro sensor, an acceleration sensor, an angular acceleration sensor, etc. The head-mountable display 1 may detect back and forth, left and right, and up and down motions of the user's head by means of a motion sensor that is a combination of one or more of a three-axis geomagnetism sensor, a three-axis acceleration sensor, and a three-axis gyro sensor.

Figure 3:
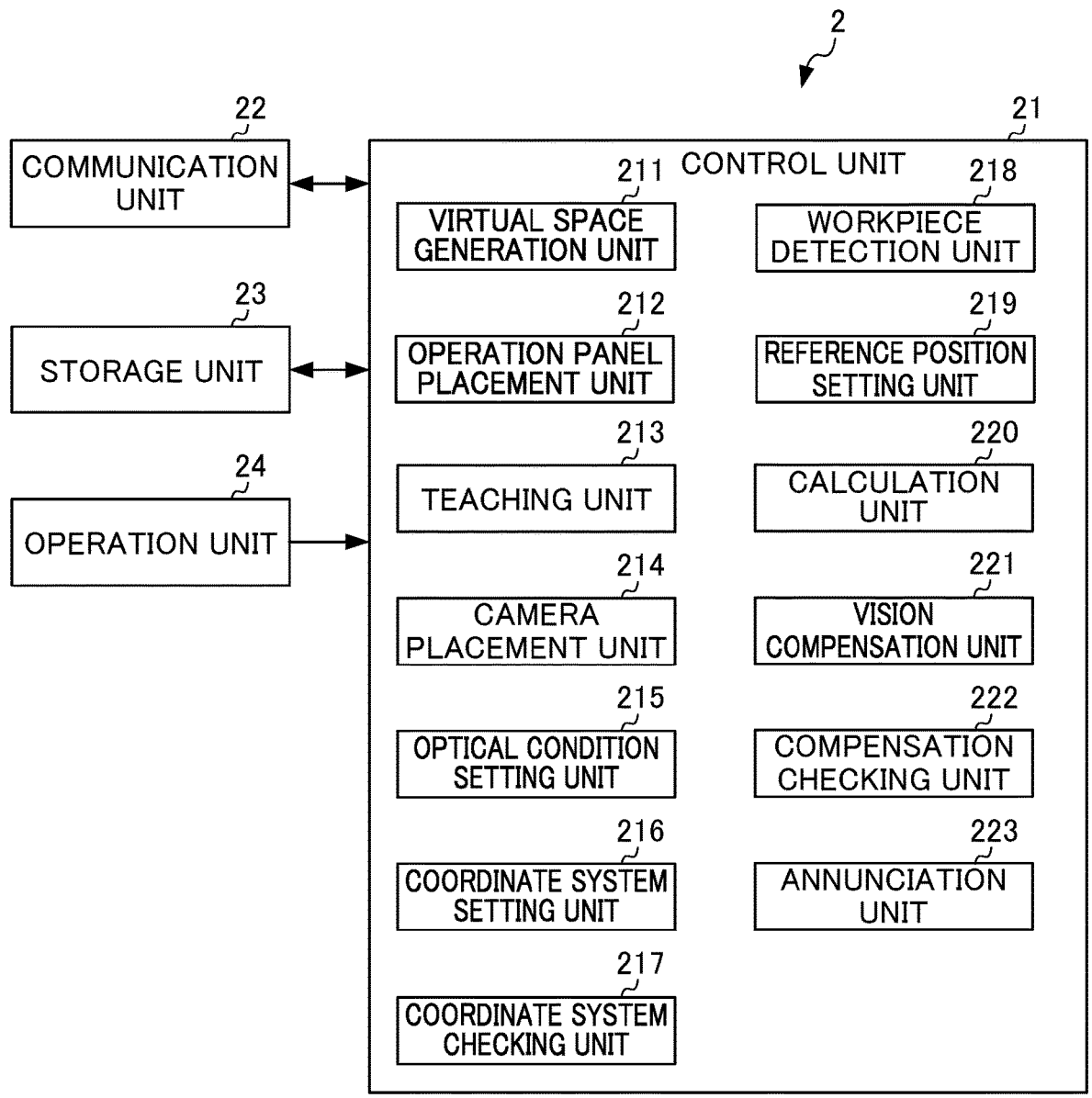
FIG. 3 is a diagram illustrating a configuration of a teaching apparatus.

FIG. 3 is a diagram illustrating a configuration of the teaching apparatus 2. As illustrated in FIG. 3, the teaching apparatus 2 includes a control unit 21, a communication unit 22, a storage unit 23, and an operation unit 24. The control unit 21 includes a processor such as a CPU, and preforms various functions by executing programs stored in the storage unit 23.

The control unit 21 includes a virtual space generation unit 211, an operation panel placement unit 212, a teaching unit 213, a camera placement unit 214, an optical condition setting unit 215, a coordinate system setting unit 216, a coordinate system checking unit 217, a workpiece detection unit 218, a reference position setting unit 219, a calculation unit 220, a vision compensation unit 221, a compensation checking unit 222, and an annunciation unit 223.

The communication unit 22 is a communication interface for communication with the head-mountable display 1 via a network. The communication unit 22 includes a processor, a connector, an electrical circuit, an antenna, etc. for performing communication. The communication unit 22 acquires data by performing predetermined processing on a communication signal received from the head-mountable display 1, and inputs the acquired data to the control unit 21. Furthermore, the communication unit 22 generates a communication signal by performing predetermined processing on data inputted from the control unit 21, and transmits the generated communication signal to the head-mountable display 1.

The storage unit 23 is a storage device including, for example, ROM and/or RAM that store an OS, application programs, etc.; and a hard disk drive and/or an SSD that store other various types of information. The operation unit 24 includes a keyboard, a pointing device, etc., accepts an operation signal and a setting signal from the operator, and provides them to the control unit 21.

Figure 4:
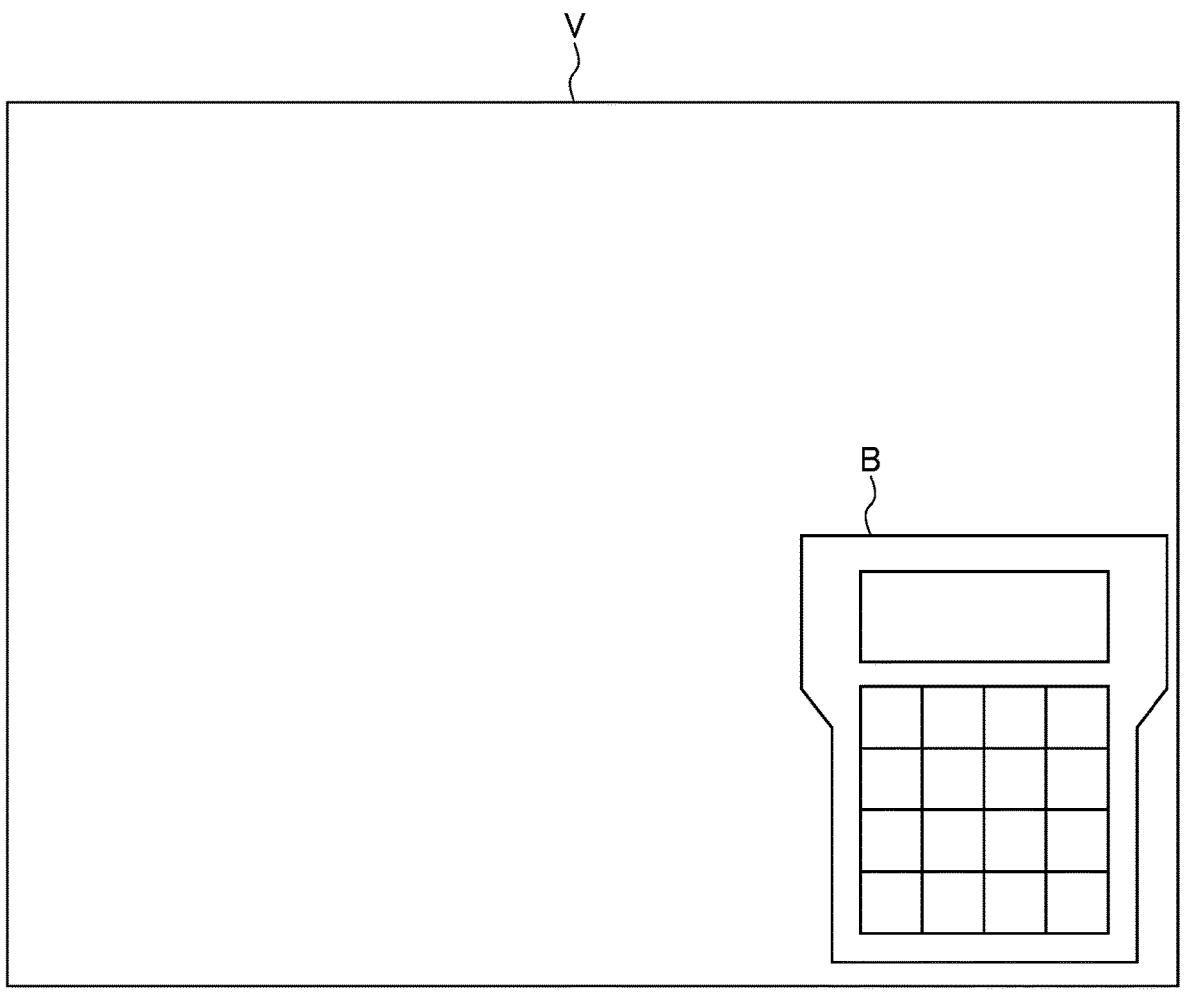
FIG. 4 is a diagram illustrating a teaching operation panel placed in a virtual space.
Figure 5:
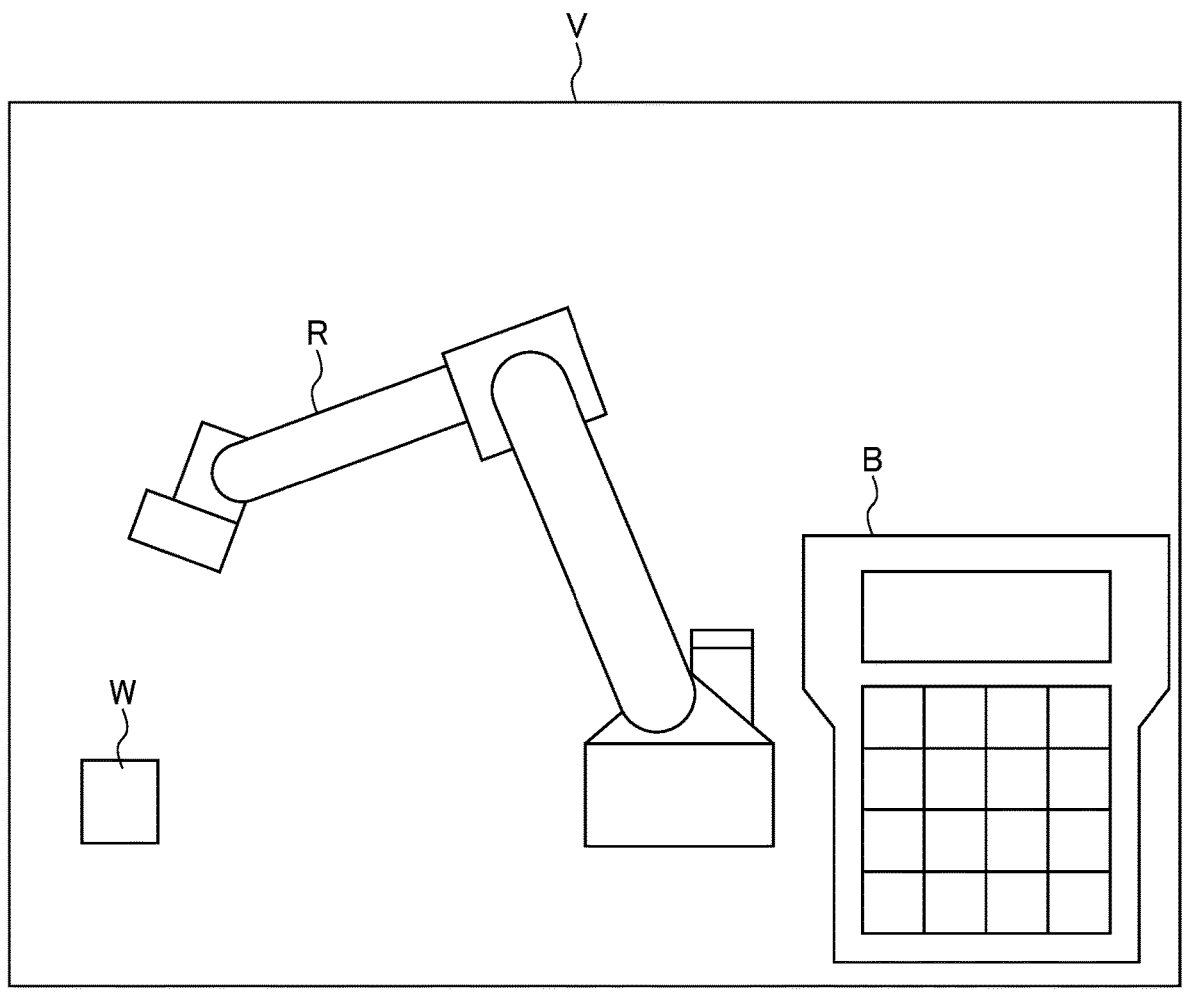
FIG. 5 is a diagram illustrating a workpiece and a robot placed in the virtual space.
Figure 6:
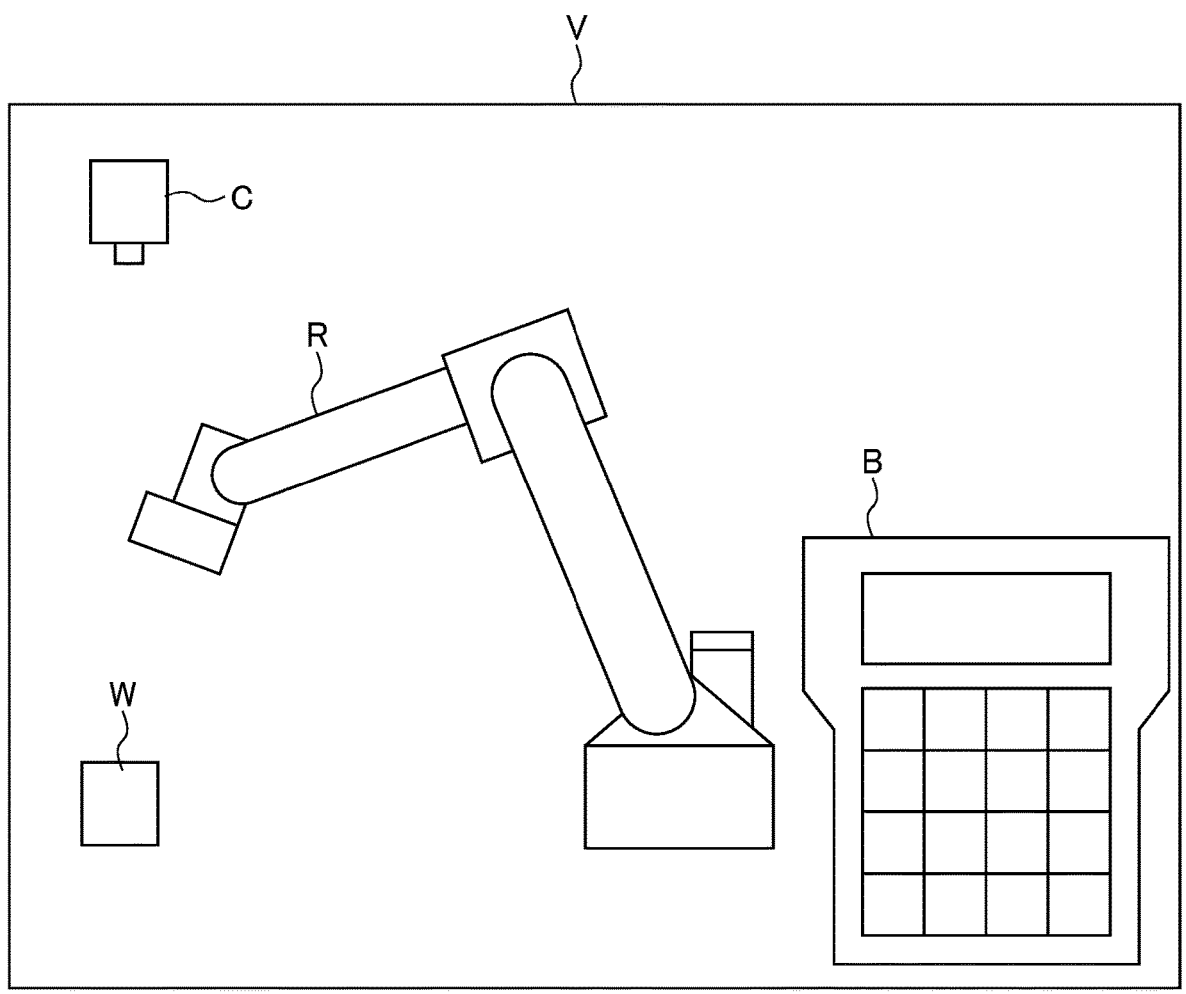
FIG. 6 is a diagram illustrating a camera placed in the virtual space.
Figure 7:
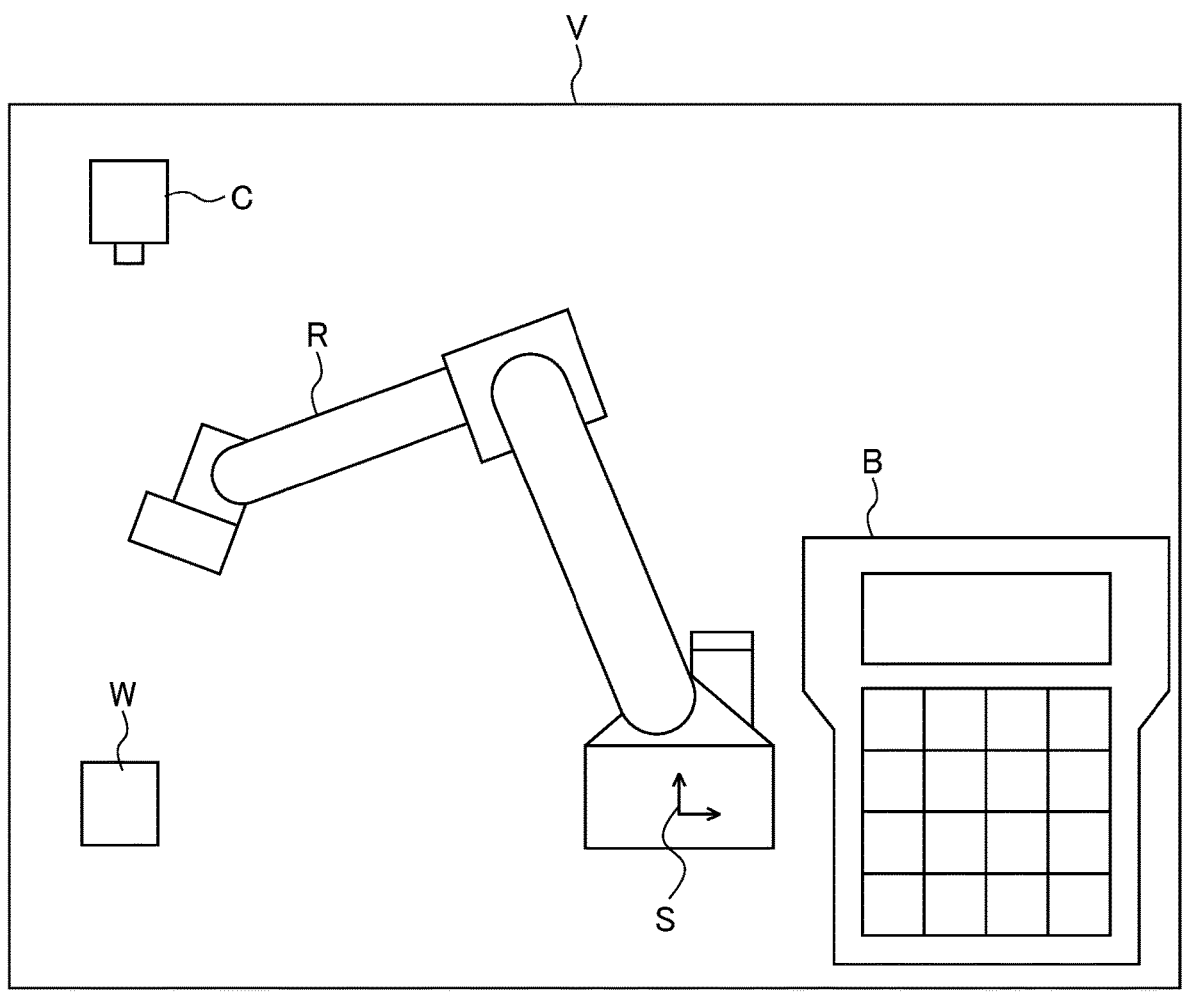
FIG. 7 is a diagram illustrating a coordinate system placed in the virtual space.

Next, process of the practical training for vision compensation in a virtual space will be described with reference to FIGS. 4 to 7. FIGS. 4 to 7 are diagrams illustrating an object(s) placed in the virtual space. Specifically, FIG. 4 illustrates a teaching operation panel B placed in the virtual space V. FIG. 5 illustrates a workpiece W and a robot R placed in the virtual space V. FIG. 6 illustrates a camera C placed in the virtual space V. FIG. 7 illustrates a coordinate system S placed in the virtual space V.

First, the virtual space generation unit 211 generates an image of the virtual space. Specifically, as illustrated in FIG. 4, the virtual space generation unit 211 generates the image of the virtual space V for providing practical training for vision compensation of a robot, based on posture information detected by the posture sensor 17. As will be described later, in the virtual space V, images of objects such as the teaching operation panel, the robot, the workpiece, the camera, and the coordinate system can be displayed. The operator practices (simulates) the vision compensation while viewing the image of the virtual space V displayed on the display panel 14 of the head-mountable display 1. Based on the posture information detected by the posture sensor 17, the virtual space generation unit 211 can generate the image of the virtual space V that reflects motions of the operator's head.

As illustrated in FIG. 4, the operation panel placement unit 212 places, in the virtual space V, the teaching operation panel B for the robot. The teaching operation panel B has a virtual input part that includes keys, etc. for teaching the robot to perform a motion, and a virtual display part that displays, for example, a command corresponding to the motion to be taught and an image captured by the camera.

The operator operates the teaching operation panel B displayed in the virtual space V by means of the operation unit 24, and thereby carries out teaching, setting, etc. for performing the vision compensation.

As illustrated in FIG. 5, the teaching unit 213 places the robot R and the workpiece W in the virtual space V, and teaches the robot R to perform a predetermined motion with respect to the workpiece W.

Specifically, the teaching unit 213 places the objects corresponding to the robot R and the workpiece W in the virtual space V for the operator. The teaching unit 213 uses CAD data stored in advance in the storage unit 23 to place the objects corresponding to the robot R and the workpiece W in the virtual space V. Here, the predetermined motion of the robot R includes arbitrary motions performed by the robot R with respect to the workpiece W, such as grasping the workpiece W.

In response to the operator operating the teaching operation panel B, the teaching unit 213 sets a motion program of the robot R and teaches the robot R to perform a predetermined motion with respect to the workpiece W.

Next, as illustrated in FIG. 6, the camera placement unit 214 places the camera C at a position in the virtual space V such that the workpiece W is within the field of view of the camera C. An image captured by the camera C is displayed on the teaching operation panel B. The operator can finetune the position of the camera C while viewing the image displayed on the teaching operation panel B. The image captured by the camera C may be displayed not only on the teaching operation panel B but also in a separate window in the virtual space V.

The optical condition setting unit 215 sets optical conditions of the camera C placed in the virtual space V. Specifically, the optical condition setting unit 215 can simulate the aperture of the lens, exposure time, focus of the lens, etc. of the camera C. For example, the optical condition setting unit 215 can vary the brightness of the image captured by the camera C, by changing the aperture, exposure time, etc. of the camera C. In addition, the optical condition setting unit 215 can sharpen the image captured by the camera C by adjusting the focus of the lens. It is desirable for the camera C and the optical condition setting unit 215 to reproduce, in the virtual space, the same camera and lens as the actual camera and lens.

The coordinate system setting unit 216 sets a coordinate system for the vision compensation. For example, the coordinate system setting unit 216 sets an installation position of a dot pattern jig that is disposed in place of the workpiece W for the calibration of the camera C, and sets a coordinate system for determining a compensation surface. To perform the calibration of the camera C, an image of the dot pattern jig whose installation position has been set by the operator is captured by the camera C, so that information regarding the position of the workpiece W in the image captured by the camera C is converted into position information in the coordinate system that serves as a reference based on which the robot R performs motions.

In the case where the vision compensation is performed using a two-dimensional camera, the operator sets a coordinate system for determining a compensation plane such that the compensation is performed by way of measurement of an amount of deviation of the workpiece W on the set compensation plane. As illustrated in FIG. 7, the coordinate system setting unit 216 sets, in the virtual space V, a coordinate system S as a coordinate system for performing the vision compensation, and places the coordinate system S in the virtual space V. A compensation plane determined based on the coordinate system S is used to measure the amount of deviation of the workpiece W and to perform the compensation.

If the position of the dot pattern jig disposed in place of the workpiece W for the calibration of the camera C is not properly set, the coordinate system checking unit 217 causes the annunciation unit 223 to display an alarm indicating that the position of the dot pattern jig is not properly set. This feature allows the operator to learn how to properly set the coordinate system.

If a positional relation between the robot R and the camera C determined by way of the calibration of the camera C is different from a positional relation between the robot R and the camera C placed in the virtual space V, the coordinate system checking unit 217 causes the annunciation unit 223 to display an alarm indicating that the position of the robot R and the position of the camera C are not properly set.

The workpiece detection unit 218 teaches a model pattern modeling the workpiece W and uses the model pattern to detect the position of the workpiece W from an image of the workpiece W captured by the camera C. The reference position setting unit 219 sets, as the reference position of the workpiece W, the position at which the workpiece W has been detected by the workpiece detection unit 218 in the captured image.

After the position of the workpiece W has been moved, the workpiece detection unit 218 detects the position of the workpiece W again in the captured image. The calculation unit 220 then calculates the amount of deviation between the position of the workpiece detected by the workpiece detection unit 218 and the reference position.

After the position of the workpiece W has been moved, the vision compensation unit 221 performs vision compensation on a predetermined motion, based on the image captured by the camera C. Specifically, the vision compensation unit 221 compensates a teaching position of the robot R by the amount of deviation calculated based on the image captured by the camera C, and teaches the robot R to perform the predetermined motion with respect to the workpiece W.

The compensation checking unit 222 checks whether the vision compensation is being properly performed on the predetermined motion with respect to the workpiece W. For example, once the position of the workpiece W has been moved, the amount of movement of the workpiece W is known in the virtual space V. An amount of vision compensation is calculated from the position of workpiece W detected in the image captured by the camera C, and the compensation checking unit 222 can check whether the vision compensation is being properly performed, by way of a comparison between the amount of movement of the workpiece W and the amount of vision compensation.

For example, in a case in which the vision compensation is not being properly performed, the robot R cannot properly complete the predetermined motion with respect to the workpiece W after the position of the workpiece W has been moved. In this case, the compensation checking unit 222 causes the annunciation unit 223 to display an alarm indicating that vision compensation is not being properly performed.

The annunciation unit 223 displays the alarm in the virtual space V. Specifically, as described above, when the coordinate system S is not at a position suitable for the vision compensation or when the vision compensation is not being properly performed, the annunciation unit 223 displays the alarm in a separate window in the virtual space V.

As can be seen from the foregoing, the feature in which the robot R, the workpiece W, the camera C, the coordinate system S, etc. are placed in the virtual space V allows the operator to visually check whether the setting for the coordinate system, the vision compensation, etc. are being properly implemented. Furthermore, the system can display the alarm in the case where the settings are not appropriate. Thereafter, the operator can modify the settings so that that vision compensation will be properly performed.

FIG. 8 is a flowchart illustrating the process performed by the vision compensation training system 100. In Step S1, the virtual space generation unit 211 generates an image of the virtual space V. The virtual space V generated by the virtual space generation unit 211 is displayed on the display panel 14 of the head-mountable display 1.

In Step S2, the operation panel placement unit 212 places the teaching operation panel B of the robot R in the virtual space V. The position at which the teaching operation panel B is placed may be set in advance or may be settable by way of an operation by the operator.

In Step S3, the teaching unit 213 places the robot R and workpiece W in the virtual space V, and teaches the robot R to perform a predetermined motion with respect to the workpiece W.

In Step S4, the camera placement unit 214 places the camera C at a position in the virtual space V such that the workpiece W is within the field of view of the camera C.

In Step S5, the coordinate system setting unit 216 sets the coordinate system S for the vision compensation in the virtual space V and places the coordinate system S in the virtual space V. The coordinate system checking unit 217 checks whether the coordinate system S set by the coordinate system setting unit 216 is at a position suitable for the vision compensation. If the coordinate system S is not at a position suitable for the vision compensation, the annunciation unit 223 displays, in a separate window in the virtual space V, an alarm indicating that the coordinate system S is not at a suitable position.

In Step S6, after the position of the workpiece W has been moved, the vision compensation unit 221 performs the vision compensation on the predetermined motion, based on an image captured by the camera C. In Step S7, the compensation checking unit 222 checks whether the vision compensation is being properly performed on the predetermined motion with respect to the workpiece W. If the vision compensation is not being properly performed, the annunciation unit 223 displays, in a separate window in the virtual space V, an alarm indicating that vision compensation is not being properly performed.

According to the present embodiment, the vision compensation training system 100 for providing practical training for the vision compensation includes the head-mountable display 1 capable of displaying an image of a virtual space, and the teaching apparatus 2 communicatively connected to the head-mountable display. The teaching apparatus 2 includes the virtual space generation unit 211 that generates the image of the virtual space, the teaching unit 213 that places the robot R and the workpiece W in the virtual space V and teaches the robot R to perform a predetermined motion with respect to the workpiece W, the camera placement unit 214 that places the camera C at a position in the virtual space V such that the workpiece W is within the field of view of the camera C, the vision compensation unit 221 that performs, after the position of the workpiece W has been moved, vision compensation on the predetermined motion, based on an image captured by the camera C, and the compensation checking unit 222 that checks whether the vision compensation is being properly performed on the predetermined motion.

By using the vision compensation training system 100 having the above-described configuration, the operator can receive practical training for the vision compensation while viewing the image of virtual reality displayed on the head-mountable display 1. Thus, the operator immerses him/herself deeply in the world of images and can receive the practical training with efficiency.

The vision compensation training system 100 further includes the controller and the teaching operation panel that are for the robot. The head-mountable display 1 is communicatively connected to the controller, and an operation is enabled via the teaching operation panel connected to the controller. The teaching apparatus 2 further includes the operation panel placement unit 212 that places the teaching operation panel B for the robot in the virtual space V. The teaching apparatus 2 further includes the coordinate system setting unit 216 that sets the coordinate system S for the vision compensation in the virtual space and places the coordinate system S in the virtual space. The teaching apparatus 2 further includes the coordinate system checking unit 217 that checks whether the coordinate system S set by the coordinate system setting unit 216 is at a position suitable for performing the vision compensation. This feature allows the operator to intuitively understand that the coordinate system S is at a position suitable for performing the vision compensation. As a result, the operator can receive the practical training for the vision compensation with efficiency.

The teaching apparatus 2 further includes the optical condition setting unit 215 that sets optical conditions of the camera C. Due to this feature, the vision compensation training system 100 can simulate the optical conditions of the camera C, thereby allowing the operator to suitably set the optical conditions of the camera C.

The teaching apparatus 2 further includes the annunciation unit 223 that displays an alarm in the virtual space V. Due to this feature, the vision compensation training system 100 can inform the operator that the setting for the coordinate system S or the setting for the vision compensation is not properly implemented, by means of the displayed alarm.

The teaching apparatus 2 further includes the workpiece detection unit 218 that teaches a model pattern of the workpiece W and uses the model pattern to detect the position of the workpiece W from an image of the workpiece W captured by the camera C, the reference position setting unit 219 that sets, as the reference position of the workpiece W, the position at which the workpiece W has been detected by the workpiece detection unit 218 in the captured image, and the calculation unit 220 that calculates, after the position of the workpiece W has been moved, an amount of deviation between the position of the workpiece W detected by the workpiece detection unit 218 and the reference position. The vision compensation unit 221 then performs vision compensation on the predetermined motion, based on the calculated amount of deviation. In this way, the vision compensation training system 100 can properly perform the vision compensation based on the calculated amount of deviation.

While embodiments of the present invention have been described in the foregoing, the embodiments described above are not intended to limit the present invention. The effects described in the above embodiments are merely the most favorable ones of the effects exerted by the present invention. The effects of the present invention are not limited to those described above.

EXPLANATION OF REFERENCE NUMERALS

100: Vision compensation training system
1: Head-mountable display
2: Teaching apparatus
21: Control unit
22: Communication unit
23: Storage unit
24: Operation unit
211: Virtual space generation unit
212 Operation panel placement unit
213: Teaching unit
214: Camera placement unit
215: Optical condition setting unit
216: Coordinate system setting unit
217: Coordinate system checking section
218: Workpiece detection unit
219: Reference position setting unit
220: Calculation unit
221: Vision compensation unit
222: Compensation checking unit
223: Annunciation unit

The invention claimed is:

1. An off-line simulation system for providing practical training for vision compensation, the off-line simulation system comprising:
    an information processor capable of displaying an image of a virtual space; and
    a teaching apparatus communicatively connected to the information processor, the teaching apparatus comprising
        a virtual space generation unit that generates the image of the virtual space,
        a teaching unit that places a robot and a workpiece in the virtual space and teaches the robot to perform a predetermined motion with respect to the workpiece,
        a camera placement unit that places a camera at a position in the virtual space such that the workpiece is within a field of view of the camera,
        a vision compensation unit that performs, after a position of the workpiece has been moved, vision compensation on the predetermined motion based on an image captured by the camera, and
        a compensation checking unit that checks whether the vision compensation is being properly performed on the predetermined motion.

2. The off-line simulation system according to claim 1, further comprising:
    a controller and a teaching operation panel that are for the robot,
    wherein the information processor is communicatively connected to the controller, and an operation is enabled via the teaching operation panel connected to the controller.

3. The off-line simulation system according to claim 1, wherein the teaching apparatus further comprises an operation panel placement unit that places a teaching operation panel for the robot in the virtual space.

4. The off-line simulation system according to claim 1, wherein the teaching apparatus further comprises a coordinate system setting unit that sets a coordinate system for the vision compensation in the virtual space and places the coordinate system in the virtual space.

5. The off-line simulation system according to claim 4, wherein the teaching apparatus further comprises a coordinate system checking unit that checks whether the coordinate system set by the coordinate system setting unit is at a position suitable for performing the vision compensation.

6. The off-line simulation system according to claim 1, wherein the teaching apparatus further comprises an optical condition setting unit that sets optical conditions of the camera.

7. The off-line simulation system according to claim 1, wherein the teaching apparatus further comprises an annunciation unit that displays an alarm in the virtual space.

8. The off-line simulation system according to claim 1, wherein the teaching apparatus further comprises
    a workpiece detection unit that teaches a model pattern of the workpiece and uses the model pattern to detect the position of the workpiece from an image of the workpiece captured by the camera,
    a reference position setting unit that sets, as a reference position of the workpiece, a position at which the workpiece has been detected by the workpiece detection unit in the captured image, and
    a calculation unit that calculates, after the position of the workpiece has been moved, an amount of deviation between the position of the workpiece detected by the workpiece detection unit and the reference position, and
    wherein the vision compensation unit performs the vision compensation on the predetermined motion, based on the calculated amount of deviation.

* * * * *